(12) United States Patent
Lu (10) Patent No.: US 9,092,066 B1
(45) Date of Patent: Jul. 28, 2015

(54) PALM HELD REAR-FACING KEYBOARD FOR ELECTRONIC DEVICE

(71) Applicant: Baojing Lu, Issaquah, WA (US)

(72) Inventor: Baojing Lu, Issaquah, WA (US)

(73) Assignee: Mark H. Plager, Huntington Beach, CA (US)

(*) Notice: Subject to any disclaimer, the term of this patent is extended or adjusted under 35 U.S.C. 154(b) by 0 days.

(21) Appl. No.: 14/268,906

(22) Filed: May 2, 2014

(51) Int. Cl.
G06F 3/02 (2006.01)

(52) U.S. Cl.
CPC .................................. *G06F 3/0202* (2013.01)

(58) Field of Classification Search
CPC ... G06F 3/0202; G06F 3/0216; G06F 1/1662; G06F 1/1664
See application file for complete search history.

(56) References Cited

U.S. PATENT DOCUMENTS

| 8,649,164 | B1 | 2/2014 | Kwok |
| 2003/0117374 | A1 | 6/2003 | McCloud |
| 2005/0104855 | A1 | 5/2005 | Grossmeyer |
| 2007/0201931 | A1 | 8/2007 | Bowen |
| 2007/0268261 | A1 | 11/2007 | Lipson |
| 2008/0145127 | A1 | 6/2008 | Liu |
| 2008/0285214 | A1 | 11/2008 | Kohmoto |

*Primary Examiner* — Andrew Sasinowski
(74) *Attorney, Agent, or Firm* — Mark H. Plager (57) ABSTRACT

A rear-facing keyboard for use with a mobile electronic device to enhance typing efficiency and accuracy of a user while allowing for a larger front display area of the device includes a cover secured to the mobile electronic device, and a plurality of key groups affixed to a rear side of the cover, the plurality of key groups having a separate group corresponding to each thumb, index finger, middle finger, ring finger and pinky finger of the user, the plurality of key groups being disposed along a path on the cover having a non-concentric curvature that follows a natural resting position of the fingers when the electronic device is held horizontally with the bottom corners of the cover placed within the palms of the user.

10 Claims, 7 Drawing Sheets

PALM HELD REAR-FACING KEYBOARD FOR ELECTRONIC DEVICE

BACKGROUND

The embodiments herein relate generally to keyboards for mobile electronic devices.

Mobile electronic devices such as smartphones and tablets are becoming increasingly popular. These devices include a display and a keyboard on the front face of the device. The keyboard may be a physical keypad with raised buttons or a touchscreen keypad on the display of the device. In either case, the physical keypad or touchscreen keypad on the front display limits the screen area that can display visual content to the user such as webpages, emails, SMS messages, games, or the like. In some instances, touchscreen keypads take approximately 40 percent of the electronic device's display. This is disadvantageous because a smaller screen area to display content reduces the user's productivity when performing a task. Further, keyboards affixed to the front of the device are primarily designed to be used with the user's thumbs instead of all fingers. This reduces the user's typing efficiency.

One way of increasing the display area of an electronic device is to place the keyboard on the rear face of the device. U.S. Patent Application Publications 2003/0117374A1, 2005/0104855A1, 2007/0201931A1, 2007/0268261A1, 2008/0285214A1 and 2008/0145127 disclose back-typing computer keyboards. However, these keyboards are disadvantageous because the keys are packed within a rectangular area. This makes them difficult to use because the keys are not positioned near the user's natural resting finger position. U.S. Pat. No. 8,649,164B1 discloses a rearward facing keyboard for mobile computing devices comprising two partial key fields wherein each key field comprises rows of keys that form concentric arcs resembling a quarter slice of a circle. The computing device is designed to be held between the user's thumbs on the front of the device and remaining fingers on the back of the device. This eliminates the user's thumbs for typing and restricts the flexibility of the remaining fingers. This results in inefficient and inaccurate typing, and may cause the user to suffer finger fatigue and/or strain.

As such, there is a need in the industry for a rear-facing keyboard for mobile electronic devices that enables a user to use all ten fingers when typing, which effectively enhances typing efficiency and accuracy while reducing user fatigue.

SUMMARY

A palm held rear-facing keyboard for use with a case for a mobile electronic device to allow a user to type with all 10 fingers of the user, the palm held rear-facing keyboard being configured to enhance typing efficiency and accuracy of a user while allowing for a larger front display area of the mobile electronic device. The palm held rear-facing keyboard comprises a cover secured to the mobile electronic device, and a plurality of key groups affixed to a rear side of the cover and left and right edges, the plurality of key groups comprising a separate group corresponding to each thumb, index finger, middle finger, ring finger and pinky finger of the user, the plurality of key groups being disposed along a path on the cover comprising a non-concentric curvature that follows a natural resting position of the fingers when the electronic device is held horizontally with the bottom corners of the cover placed within the palms of the user, wherein the user types with the palm held rear-facing keyboard, thereby enhancing typing efficiency and accuracy.

In an alternative embodiment of the invention, the palm held rear-facing keyboard may be directly affixed to the rear face of the mobile electronic device.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
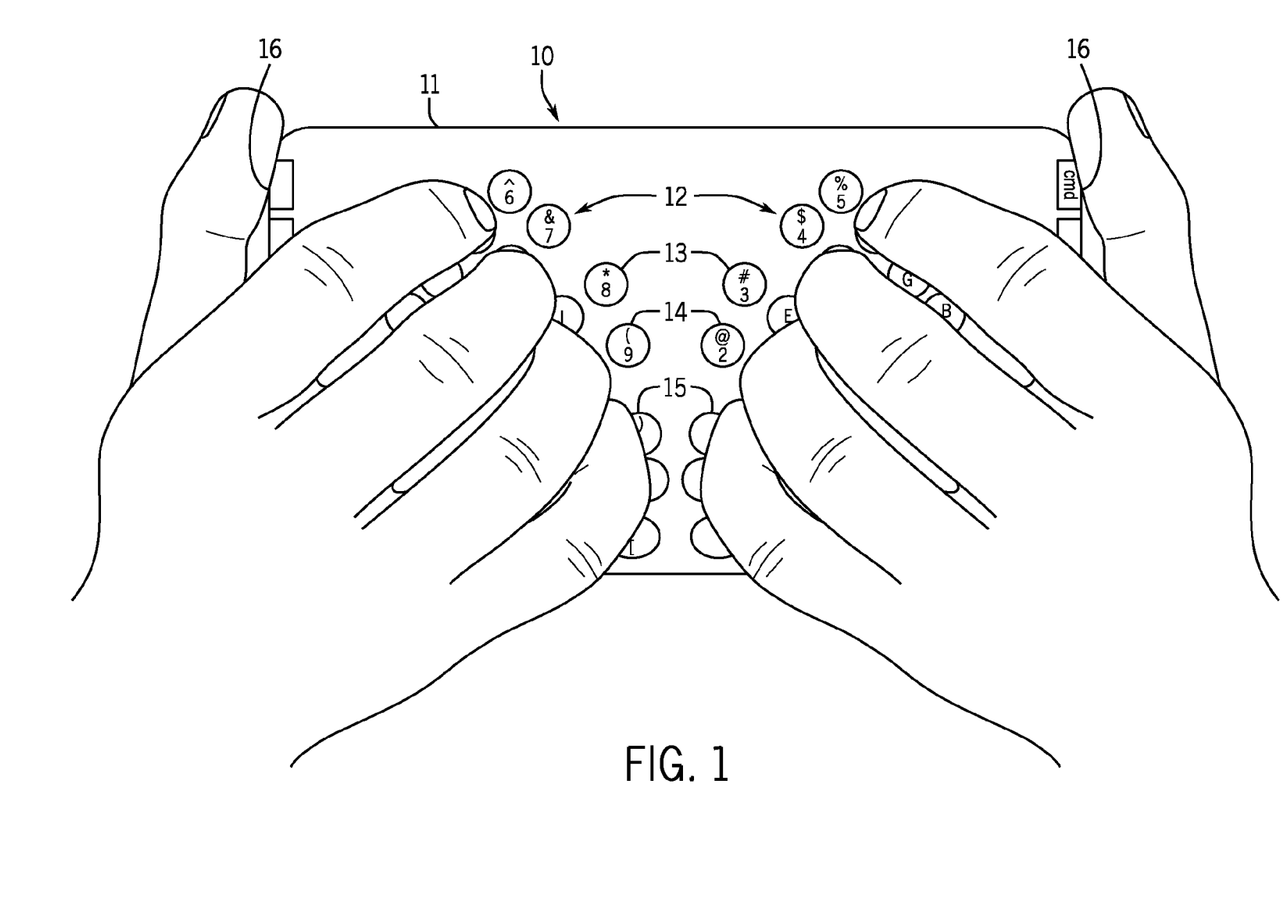
FIG. 1 depicts a rear elevation view of certain embodiments of the palm held rear-facing keyboard in use.

As depicted in FIG. 1, electronic device 10 is designed to be used with case 11, which is secured to the device. Case 11 may be made from any materials or combination of materials such as plastic, rubber, or the like. When case 11 is secured to electronic device 10, the front display of the device (not shown) is visible to the user. The user holds electronic device 10 and case 11 horizontally in his/her palms at the two bottom corners such that the display of electronic device 10 faces the user. In this configuration, the bottom corners of case 11 are placed within the palms of the user. The user's thumbs rest on the sides of case 11 close to thumb keys 16. Electronic device 10 may be any mobile device including, but not limited to, a smartphone or tablet. The rear face of case 11 comprises index finger keys 12, middle finger keys 13, ring finger keys 14, pinky finger keys 15 and thumb keys 16.

Figure 2:
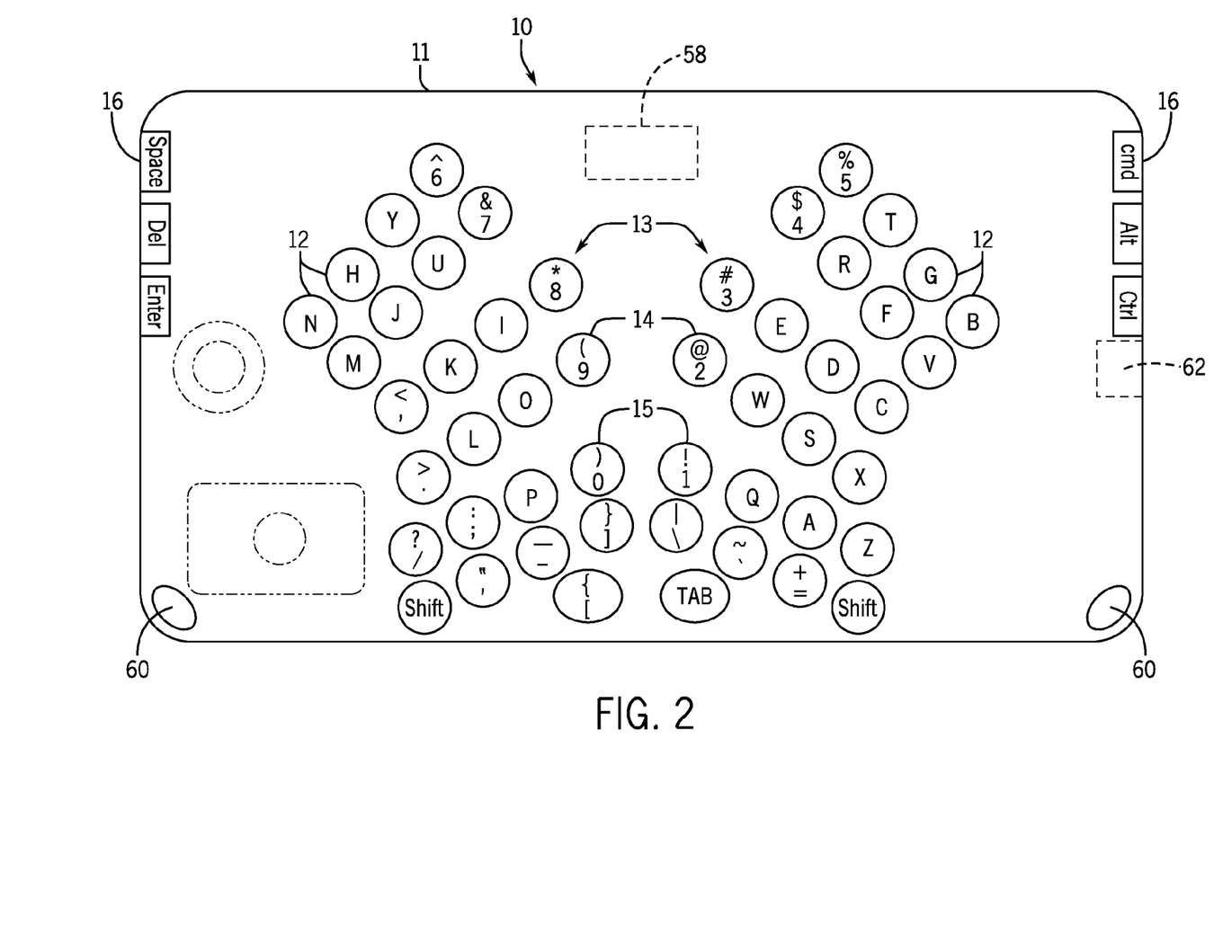
FIG. 2 depicts a rear elevation view of certain embodiments of the palm held rear-facing keyboard depicting the layout of the keys.

As depicted in FIG. 2, index finger keys 12, middle finger keys 13, ring finger keys 14 and pinky finger keys 15 comprise alphanumeric characters used with QWERTY keyboards. Thumb keys 16 comprise alternative keys such as a "Space" key, "Del" key and "Enter" key. It shall be appreciated that the keys on case 11 may comprise any alternative characters that correspond to any language. Case 11 further comprises keyboard processor 58 and micro USB relay component 62. Micro USB relay component 62 is configured to connect to a USB port of electronic device 10. Keyboard processor 58 comprises any electronic components and algorithms stored thereon known in the field that are configured to transmit signals from index finger keys 12, middle finger keys 13, ring finger keys 14, pinky finger keys 15 and thumb keys 16 to electronic device 10 via the micro USB relay component 62 and electronic device USB port connection. In an alternative embodiment, case 11 may comprise palm sensors 60, which are connected to keyboard processor 58 by a wired connection. Palm sensors 60 may enable or disable the keys depending on whether the user's palms are covering sensors 60 as depicted in FIG. 1. It shall be appreciated that palm sensors 60 may comprise any light-detecting components known in the field.

Figure 3:
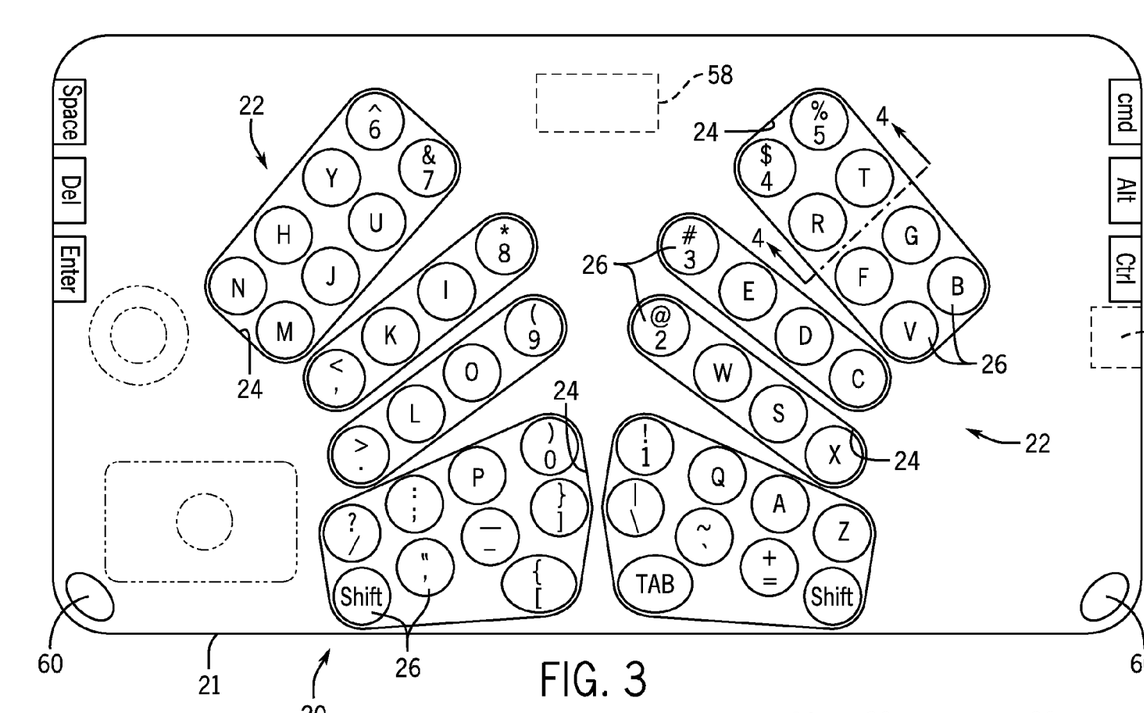
FIG. 3 depicts a rear elevation view of a first embodiment of the palm held rear-facing keyboard with key groups for all 10 fingers.

In FIG. 3, first embodiment 20 of the palm held rear-facing keyboard is depicted. In this embodiment, keyboard layout 22 of case 21 comprises a separate key group for index finger keys 12, middle finger keys 13, ring finger keys 14, pinky finger keys 15 and thumb keys 16 for the left and right hands of the user. Each key group is positioned along a path on case 21, which has a non-concentric curvature that follows a natural resting position of the user's fingers when electronic device 10 is held horizontally with the bottom corners of the case placed within the user's palms. The curvature for both the left hand and right hand finger key groups begins in a central portion of case 21 and extends outward toward an upper corner of the case. This path follows the pinky finger, ring finger, middle finger, index finger and thumb for both of the user's hands. In FIG. 3, it is apparent that the key groups follow a non-concentric curvature or arc. For example, the keys closest to palm sensor 60 ("N", "M", "<", ">", "?" and "Shift) follow a non-concentric curvature.

Figure 4:
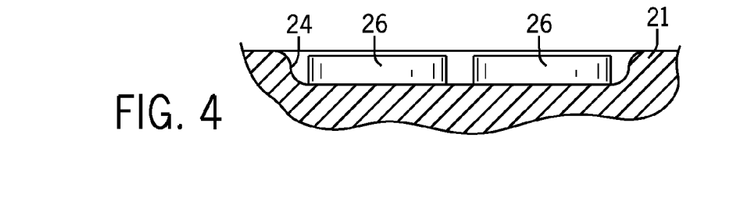
FIG. 4 depicts a cross-sectional view of the first embodiment of the palm held rear-facing keyboard taken along line 4-4 of FIG. 3.

Each key group comprises keys 26 disposed within recesses 24 of case 21. Keys 26 may comprise any materials known in the field such as plastic, rubber, or the like. A cross-sectional view of case 21, recesses 24 and keys 26 is depicted in FIG. 4. Since keys 26 are disposed within recesses 24, keys 26 are not accidently depressed if the rear face of case 21 is placed on a flat surface such as a table.

Figure 5:
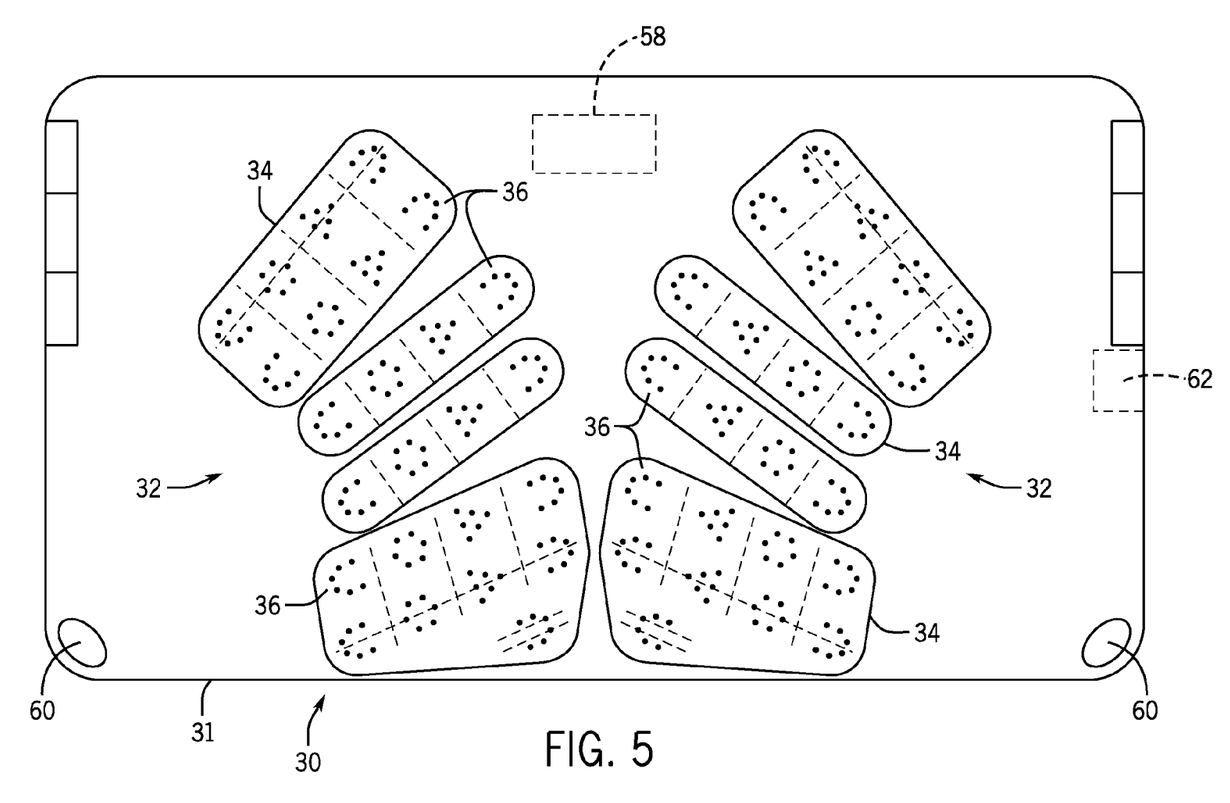
FIG. 5 depicts a rear elevation view of a second embodiment of the palm held rear-facing keyboard with touchpad keys.

In FIG. 5, second embodiment 30 of the palm held rear-facing keyboard is depicted. In this embodiment, case 31 comprises touchpad keyboard 32 comprising touchpad keys 34. Each touchpad key 34 comprises raised indicia 36, which may comprise any number and orientation of protrusions such as circular bumps. Raised indicia 36 may comprise any material such as plastic, rubber, metal, or the like. Raised indicia 36 is designed to aid the user in navigating his/her fingers throughout touchpad keys 34. For example, each key group may have six protrusions oriented in a circle to indicate the home button. Further, the outer touchpad keys 34 of each key group may comprise six protrusions oriented in a U-shape. Therefore, the user can determine the placement of his/her fingers within each key group by touching raised indicia 36 of touchpad keys 34. This is advantageous because the user is unable to see touchpad keys 34 when viewing the electronic device's display.

Figure 6:
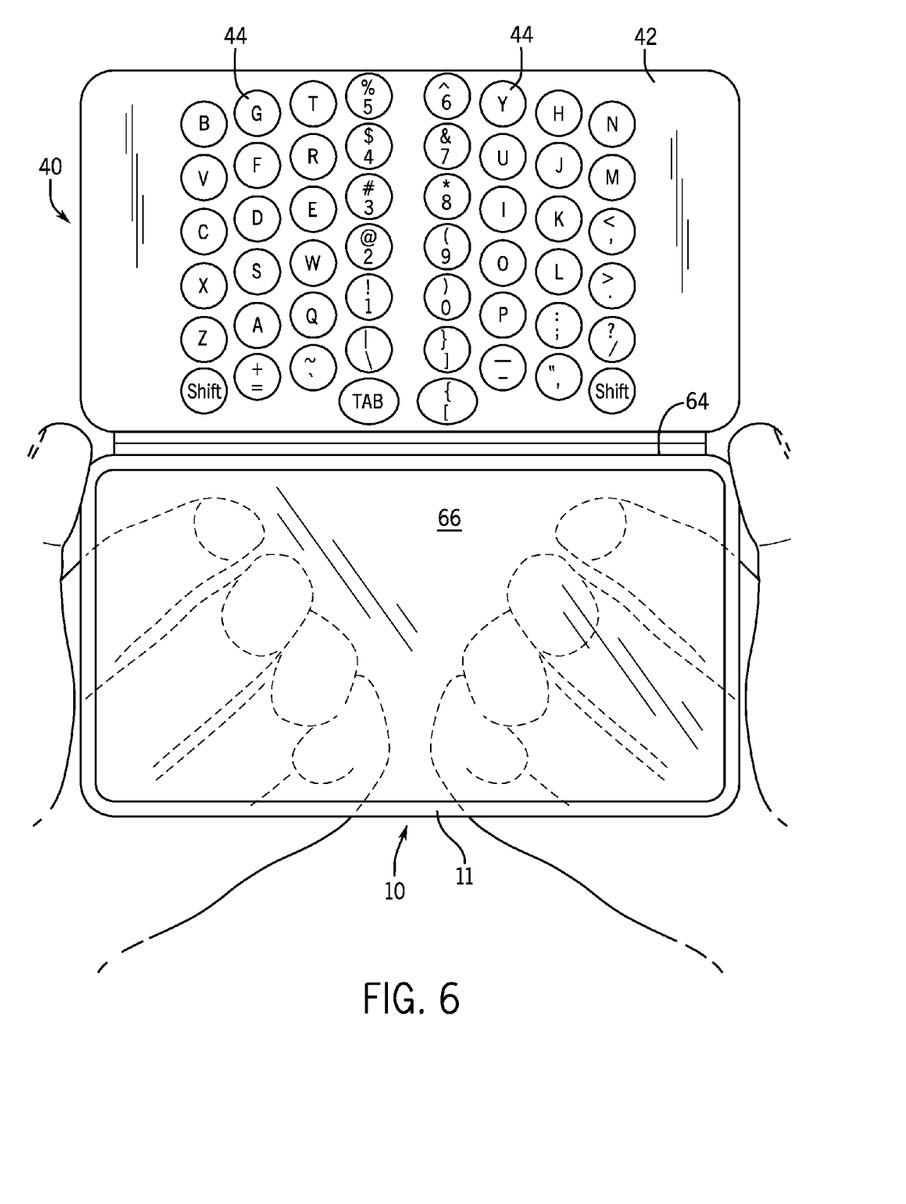
FIG. 6 depicts a front elevation view of a key legend for use with certain embodiments of the palm held rear-facing keyboard.
Figure 7:
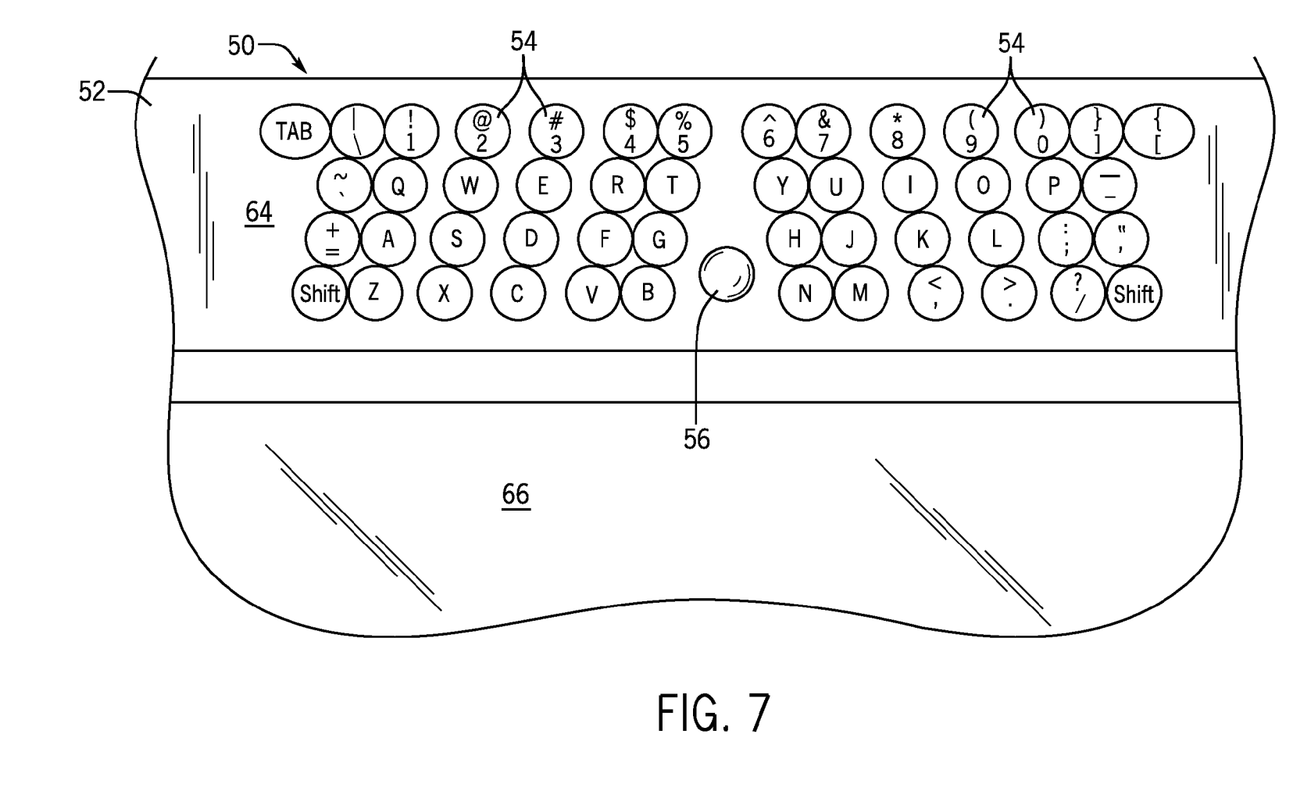
FIG. 7 depicts a front elevation view of a key legend for use with certain embodiments of the palm held rear-facing keyboard.

In FIG. 6, an alternative embodiment of case 11 is depicted, which comprises side edge 64 and flip portion 42. Flip portion 42 of case 11 comprises key legend 40 which comprises printed indicia 44. Printed indicia 44 depict a key position for each key group corresponding to each pinky finger, ring finger, middle finger and index finger of the user. Therefore, the user can view both electronic device display 66 and key legend 40 at the same time while typing on the keys on the rear-face of case 11. Since the keys are facing away from the user's line of sight, he/she can use key legend 40 to help improve typing accuracy. As depicted in FIG. 7, key legend 50 may alternatively be placed on side edge 64 of case 52. Key legend 50 comprises printed indicia 54, which displays a key position for each key group. In one embodiment of the invention, case 52 may also have indicator light 56, which illuminates when the keys are enabled on the rear face of the case.

Figure 8:
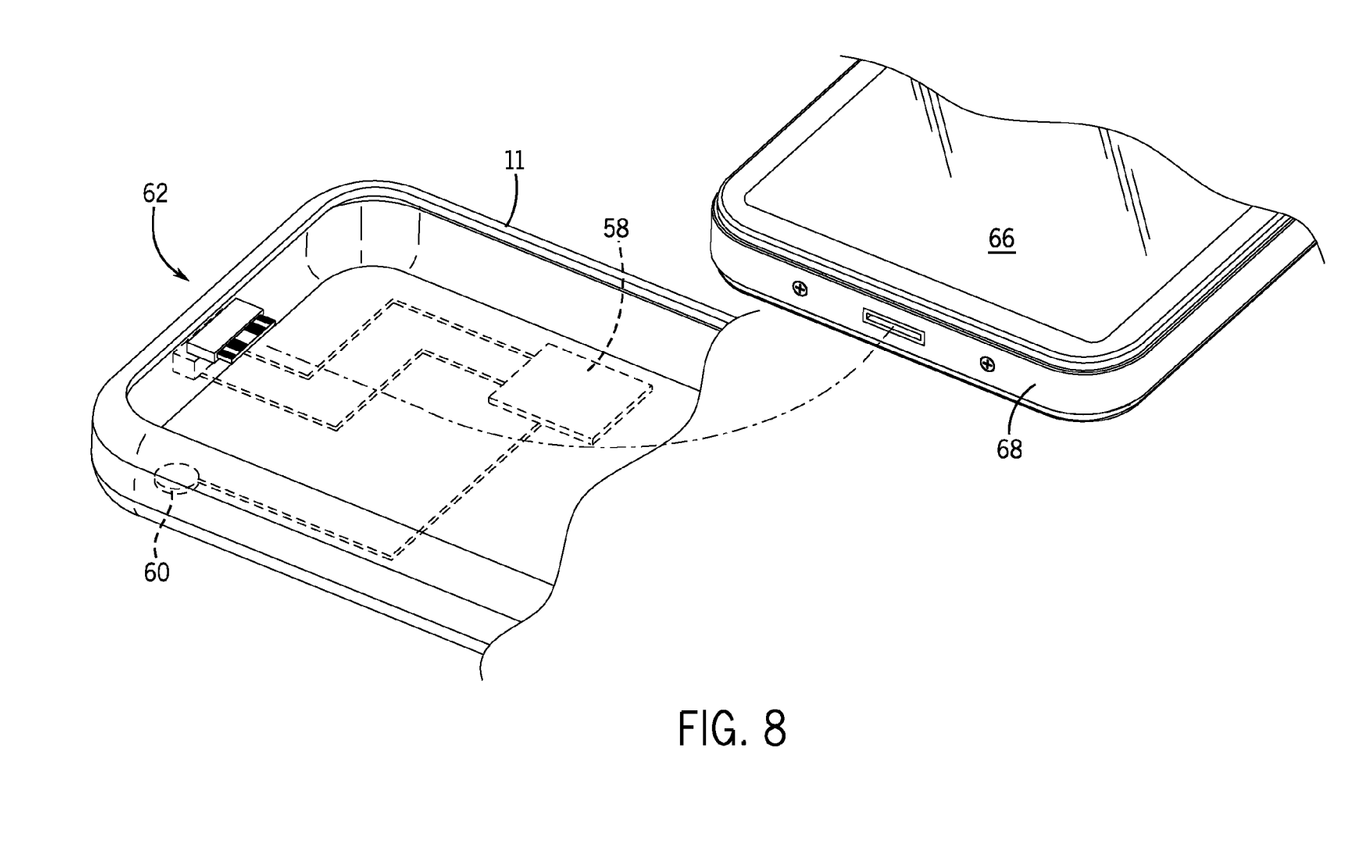
FIG. 8 depicts an exploded perspective view of certain embodiments of the palm held rear-facing keyboard depicting the mobile electronic device in use with a case.

In FIG. 8, an exploded perspective view is depicted for certain embodiments of the palm held rear-facing keyboard. The USB port of smartphone 68 connects with micro USB relay component 62 of case 11. Palm sensors 60 and micro USB relay component 62 are both connected to keyboard processor 58 by wires. In an alternative embodiment, case 11 may comprise an additional USB port (not shown), to allow a user to charge phone 68 by using an external power source and/or connect phone 68 to another electronic device such as a smartphone, tablet, laptop, desktop computer, or the like. To operate the palm held rear-facing keyboard, the user holds electronic device 10 and case 11 as described above and depicted in FIG. 1. The user can view the electronic device's display and type efficiently with the palm held rear-facing keyboard of case 11.

It shall be appreciated that the components of the palm held rear-facing keyboard described in several embodiments herein may comprise any alternative known materials in the field and be of any color, size and/or dimensions. It shall be appreciated that the components of the palm held rear-facing keyboard described herein may be manufactured and assembled using any known techniques in the field.

Persons of ordinary skill in the art may appreciate that numerous design configurations may be possible to enjoy the functional benefits of the inventive systems. For example, the palm held rear-facing keyboard described herein may be directly affixed to the rear face of the mobile electronic device. Thus, given the wide variety of configurations and arrangements of embodiments of the present invention the scope of the invention is reflected by the breadth of the claims below rather than narrowed by the embodiments described above.

What is claimed is:

1. A palm held rear-facing keyboard for use with a case for a mobile electronic device to allow a user to type with all fingers of the user, the palm held rear-facing keyboard being configured to enhance typing efficiency and accuracy of the user while allowing for a larger front display area of the mobile electronic device, the palm held rear-facing keyboard comprising:

a cover secured to the mobile electronic device; and a plurality of key groups affixed to a rear side of the cover, the plurality of key groups comprising a separate group corresponding to each thumb, index finger, middle finger, ring finger and pinky finger of the user, the plurality of key groups being disposed along a path on the cover comprising a non-concentric curvature that follows a natural resting position of the fingers when the electronic device is held horizontally with the bottom corners of the cover placed within the palms of the user, wherein the user types with the palm held rear-facing keyboard, thereby enhancing typing efficiency and accuracy.

2. The palm held rear-facing keyboard of claim 1, wherein the cover comprises a keyboard processor and a micro-USB relay component operably connected to the keyboard processor, wherein the micro-USB relay component is configured to connect with a USB port of the mobile electronic device.

3. The palm held rear-facing keyboard of claim 2, wherein the curvature of the key group path for a left hand or right hand of the user begins in a central portion of the cover and extends outward toward an upper corner of the cover to follow a path of the pinky finger, ring finger, middle finger and index finger.

4. The palm held rear-facing keyboard of claim 3, wherein the key groups corresponding to the left thumb and the right thumb of the user are proximate opposing upper edges of the cover.

5. The palm held rear-facing keyboard of claim 3, wherein each key group comprises a plurality of keys affixed to a recess in the cover.

6. The palm held rear-facing keyboard of claim 3, wherein each key group comprises a plurality of touchpad keys, wherein each touchpad key comprises raised indicia.

7. The palm held rear-facing keyboard of claim 3, wherein the cover comprises a flip portion comprising a key legend, wherein the key legend displays a key position for each key group corresponding to each pinky finger, ring finger, middle finger and index finger.

8. The palm held rear-facing keyboard of claim 3, wherein the cover comprises a key legend affixed to a side edge of the cover, wherein the key legend displays a key position for each key group.

9. The palm held rear-facing keyboard of claim 3, further comprising palm sensors affixed to the bottom corners of the rear side of the cover, wherein the palm sensors are operably connected to the keyboard processor.

10. A palm held rear-facing keyboard for use with a mobile electronic device to allow a user to type with all fingers of the user, the palm held rear-facing keyboard being configured to enhance typing efficiency and accuracy of the user while allowing for a larger front display area of the mobile electronic device, the palm held rear-facing keyboard comprising:

a plurality of key groups affixed to a rear side of the mobile electronic device, the plurality of key groups comprising a separate group corresponding to each thumb, index finger, middle finger, ring finger and pinky finger of the user, the plurality of key groups being disposed along a path comprising a non-concentric curvature that follows a natural resting position of the fingers when the electronic device is held horizontally with the bottom corners of the electronic device placed within the palms of the user, wherein the user types with the palm held rear-facing keyboard, thereby enhancing typing efficiency and accuracy.

* * * * *